United States Patent
Ozawa et al.

(10) Patent No.: US 8,163,844 B2
(45) Date of Patent: Apr. 24, 2012

(54) METHACRYLIC RESIN COMPOSITION, RESIN MODIFIER, AND MOLDED ARTICLE

(75) Inventors: Hiroshi Ozawa, Tsukuba (JP); Tomiaki Otake, Chiyoda-ku (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 418 days.

(21) Appl. No.: 12/441,144

(22) PCT Filed: Sep. 12, 2007

(86) PCT No.: PCT/JP2007/067718
§ 371 (c)(1), (2), (4) Date: Mar. 13, 2009

(87) PCT Pub. No.: WO2008/032732
PCT Pub. Date: Mar. 20, 2008

(65) Prior Publication Data
US 2010/0063210 A1 Mar. 11, 2010

(30) Foreign Application Priority Data
Sep. 15, 2006 (JP) .................. 2006-250966

(51) Int. Cl.
C08L 47/00 (2006.01)
C08L 53/00 (2006.01)
C08F 220/18 (2006.01)
C08F 293/00 (2006.01)

(52) U.S. Cl. .......................... 525/94; 525/222
(58) Field of Classification Search .............. 525/94, 525/222
See application file for complete search history.

(56) References Cited

U.S. PATENT DOCUMENTS

| | | | |
|---|---|---|---|
| 4,108,945 A * | 8/1978 | Fetters et al. ................ 525/122 |
| 5,003,004 A * | 3/1991 | Simms ............................ 525/68 |
| 6,420,479 B1 * | 7/2002 | Phan et al. ..................... 524/800 |
| 6,479,608 B1 * | 11/2002 | Nesvadba et al. .......... 526/328.5 |
| 2002/0042474 A1 | 4/2002 | Court et al. |
| 2003/0096075 A1 * | 5/2003 | Dollase et al. ............... 428/40.1 |
| 2004/0147674 A1 * | 7/2004 | Kakeda et al. ................. 525/88 |
| 2005/0085592 A1 * | 4/2005 | Taniguchi et al. ............ 525/242 |
| 2006/0128892 A1 | 6/2006 | Hidalgo et al. |

FOREIGN PATENT DOCUMENTS

| | | |
|---|---|---|
| EP | 1 167 439 A1 | 1/2002 |
| JP | 49-45148 | 4/1974 |
| JP | 6 228405 | 8/1994 |
| JP | 11 029617 | 2/1999 |
| WO | WO 2004/037921 A1 | 5/2004 |

* cited by examiner

*Primary Examiner* — Jeffrey Mullis
(74) *Attorney, Agent, or Firm* — Oblon, Spivak, McClelland, Maier & Neustadt, L.L.P.

(57) ABSTRACT

A methacrylic resin composition in which a star block copolymer (B) in the form of particles is dispersed in a matrix (A) composed of a methacrylic resin comprising not less than 50% by mass of a methyl methacrylate unit. The methacrylic resin composition is obtained by bulk-polymerizing or solution-polymerizing 100 parts by mass of a monomer mixture (A') containing 50 to 100% by mass of methyl methacrylate and 0 to 50% by mass of other vinyl monomer copolymerizable with the methyl methacrylate, in the presence of 1 to 80 parts by mass of the star block copolymer (B) comprising a polymer block (a) composed of a (meth)acrylic acid alkyl ester unit and a polymer block (b) composed of a conjugated diene compound unit, until the polymerization conversion of the monomer reaches 70% by mass or more.

9 Claims, 1 Drawing Sheet

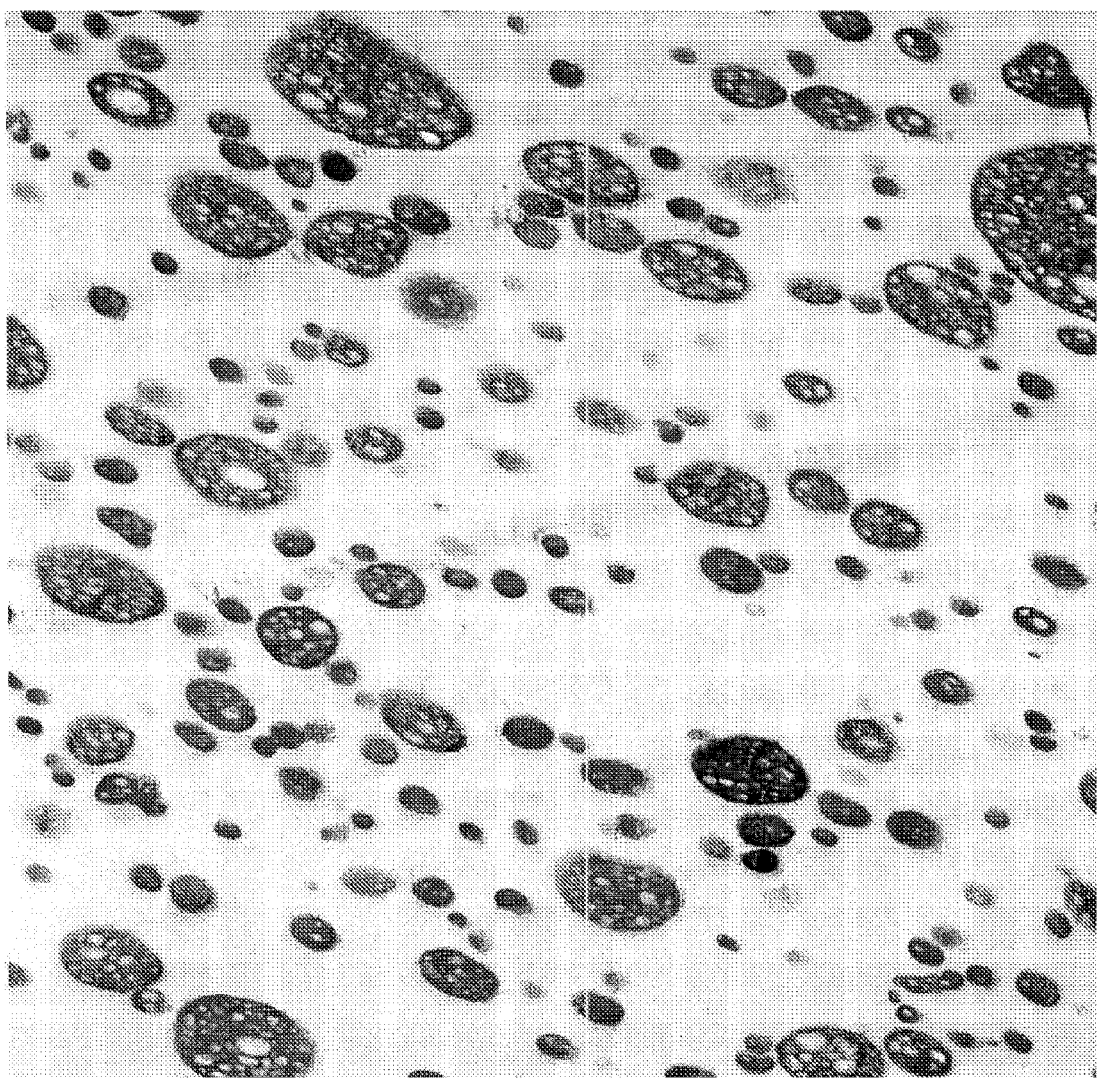

METHACRYLIC RESIN COMPOSITION, RESIN MODIFIER, AND MOLDED ARTICLE

TECHNICAL FIELD

The present invention relates to a methacrylic resin composition, from which a molded article excellent in weather resistance, impact resistance, and appearance can be obtained.

The present invention also relates to a resin modifier that can improve weather resistance, impact resistance, transparency, and appearance of methacrylic resin molded articles.

BACKGROUND ART

Molded articles of methacrylic resin represented by polymethyl methacrylate not only exhibit excellent transparency and weather resistance, but also have beautiful appearance. Therefore, methacrylic resin molded articles are used as, for example, signboard parts, display parts, illumination parts, interior parts, structural parts, transport machine-related parts, electronic equipment parts, medical-related parts, optical-related parts, traffic-related parts, and the like. However, methacrylic resins have low impact resistance, and this defect limits an even wider application of methacrylic resins.

Various methods have been proposed to improve the impact resistance of methacrylic resins. For example, Patent Document 1 discloses a method of blending a multi-layered acrylic rubber produced by emulsion polymerization, into a methacrylic resin. This method is most widely used industrially at present. This multi-layered acrylic rubber comprises three or more layers, and has a spherical structure of substantially alternating layers of a rigid layer composed mainly of methyl methacrylate and a soft layer composed mainly of acrylic acid ester such as n-butyl acrylate. However, this method does not sufficiently improve the impact resistance of methacrylic resins. Additionally, while the multi-layered acrylic rubbers are blended into the methacrylic resin, the multi-layered acrylic rubbers may be condensed into lumps (gel colonies). Due to the lumps, hard spots (fish eyes) are generated in molded articles, and therefore their appearance is impaired.

Patent Document 1: Japanese Patent Examined No. 59-36645

Patent Document 2 discloses a method of polymerizing a monomer composed mainly of methyl methacrylate in the presence of a rubber-like material composed of a butadiene-butyl acrylate copolymer. However, this method still has problems such as poor appearance of molded articles resulted from poor dispersion of the rubber-like material.

Patent Document 2: Japanese Patent Examined No. 45-26111

Patent Document 3 discloses a method of polymerizing a monomer composed mainly of methyl methacrylate in the presence of a partially hydrogenated conjugated diene polymer. However, due to insolubility in methyl methacrylate, the partially hydrogenated conjugated diene polymer used in this method must be dissolved in other solvent, which complicates the production process. Further, granulation by phase inversion, particularly control of particle size, may be difficult in this method.

Patent Document 3: International Publication No. WO 96/032440

Patent Document 4 discloses a method using a modified block copolymer in place of the partially hydrogenated conjugated diene polymer used in Patent Document 3. The modified block copolymer used in this method comprises a (meth) acrylic acid alkyl ester unit and an aromatic vinyl monomer unit. According to the method of Patent Document 4, the control of particle size by phase inversion was easily achieved; however, the impact resistance of obtained molded articles was not sufficient.

Patent Document 4: Japanese Patent Laid-Open No. 2000-313786

Patent Document 5 discloses a polymer composition comprising a component (a): 1 to 50 parts by mass of an acrylic acid ester polymer or a methacrylic acid ester polymer, and a component (b): 50 to 99 parts by mass of an epoxy-modified block polymer obtained by epoxidizing an unsaturated carbon double bond of a conjugated diene compound in a block copolymer composed of a polymer block A composed mainly of a vinyl aromatic compound and a polymer block B composed mainly of the conjugated diene compound in one molecule. According to the polymer composition of Patent Document 5, the compatibility of methacrylic resin and rubber polymer is improved; however, the impact resistance is not sufficient.

Patent Document 5: Japanese Patent Laid-Open No. 7-207110

Patent Document 6 discloses a methacrylic resin composition obtained by template polymerization, the composition comprising: 50 to 99% by mass of polymethyl methacrylate or a copolymer composed mainly of methyl methacrylate; 0 to 50% by mass of an ethylene-vinyl acetate copolymer; and 0.5 to 50% by mass of a graft copolymer containing polymethyl methacrylate or a copolymer composed mainly of methyl methacrylate and polyvinyl acetate and/or ethylene-vinyl acetate copolymer, and/or a block copolymer containing polymethyl methacrylate or a copolymer composed mainly of methyl methacrylate and polyvinyl acetate or ethylene-vinyl acetate copolymer. However, the methacrylic resin composition of Patent Document 6 has low transparency, and the impact resistance is still not sufficient.

Patent Document 6: Japanese Patent Laid-Open No. 6-345933

Patent Document 7 discloses a method of producing a methacrylic resin molding material with excellent impact resistance and processability, the method comprising reacting methyl methacrylate with a block copolymer composed of a conjugated diene polymer component rich in vinyl bonds and an acrylic acid ester or methacrylic acid ester polymer component, under the polymerization conditions. However, when the molding material obtained by this method was kneaded using a Labo Plastmill, etc., for molding, the morphology was broken and the impact resistance was reduced.

Patent Document 7: Japanese Patent Laid-Open No. 49-45148

DISCLOSURE OF THE INVENTION

Problems to be Solved by the Invention

Objects of the present invention are to provide a methacrylic resin composition that can produce a molded article excellent in weather resistance, impact resistance, and appearance; and to provide a resin modifier that can improve the weather resistance, impact resistance, transparency, and appearance of methacrylic resin molded articles.

Means for Solving the Problems

The inventors have earnestly proceeded with studies in order to achieve the above objects and found that a methacrylic resin composition having substantially improved impact resistance can be obtained by dispersing a star block copolymer (B) comprising a polymer block composed of a (meth)acrylic acid alkyl ester unit and a polymer block composed of a conjugated diene compound unit, in a matrix composed of a methacrylic resin.

The inventors also found that the weather resistance, impact resistance, transparency, and appearance of methacrylic resin molded articles can be significantly improved by a resin modifier composed of a star block copolymer comprising a polymer block composed of a specific acrylic acid alkyl ester unit and a polymer block composed of a specific conjugated diene compound unit. The present invention has been completed based on these findings and further studies.

Specifically, the present invention includes the following embodiments.

(1) A methacrylic resin composition comprising:

100 parts by mass of a matrix (A) composed of a methacrylic resin which comprises not less than 50% by mass of a methyl methacrylate unit, and 1 to 80 parts by mass of a star block copolymer (B) which comprises a polymer block (a) composed of a (meth)acrylic acid alkyl ester unit and a polymer block (b) composed of a conjugated diene compound unit, and is dispersed in the matrix (A).

(2) The methacrylic resin composition according to the above (1), wherein the star block copolymer (B) comprises an arm polymer block, and has a number average molecular weight, in terms of polystyrene measured by gel permeation chromatography (GPC), satisfying the inequality:

[the number average molecular weight of the star block copolymer]>2×[the number average molecular weight of the arm polymer block].

(3) The methacrylic resin composition according to the above (1) or (2), wherein the star block copolymer (B) is represented by the chemical structural formula:

(polymer block (a)-polymer block (b)-)$_n$X wherein X is a coupling agent residue, and n is number greater than 2.

(4) In the methacrylic resin composition, the (meth)acrylic acid alkyl ester unit is preferably an acrylic acid alkyl ester unit, and more preferably contains an n-butyl acrylate unit, or/and the conjugated diene compound unit preferably contains a 1,3-butadiene unit.

(5) In the methacrylic resin composition, the star block copolymer (B) preferably comprises 45 to 75% by mass of a polymer block (a) composed of an acrylic acid alkyl ester unit and having a glass transition temperature of 0° C. or lower, and 25 to 55% by mass of a polymer block (b) composed of a conjugated diene compound unit and having a glass transition temperature of 0° C. or lower; and the star block copolymer (B) has a refractive index of 1.48 to 1.50.

(6) A resin modifier composed of a star block copolymer (B) comprising 45 to 75% by mass of a polymer block (a) composed of an acrylic acid alkyl ester unit and having a glass transition temperature of 0° C. or lower, and 25 to 55% by mass of a polymer block (b) composed of a conjugated diene compound unit and having a glass transition temperature of 0° C. or lower, in which the star block copolymer (B) has a refractive index of 1.48 to 1.50.

(7) In the resin modifier, the acrylic acid alkyl ester unit preferably contains an n-butyl acrylate unit or/and the conjugated diene compound unit preferably contains a 1,3-butadiene unit.

(8) A molded article comprising the above methacrylic resin composition.

Advantages of the Invention

The methacrylic resin composition in the present invention has excellent molding processability, and a molded article obtained from the methacrylic resin composition has good appearance. Molding the methacrylic resin composition in the present invention can provide a molded article having excellent weather resistance, scratch resistance, and impact resistance. Even after intensive kneading process, the morphology of the methacrylic resin composition in the present invention is not impaired and its impact resistance is maintained.

Moreover, mixing the resin modifier in the present invention with a methacrylic resin can produce a methacrylic resin composition for obtaining a molded article having excellent weather resistance, scratch resistance, and impact resistance, as well as transparency.

BRIEF DESCRIPTION OF THE DRAWINGS

FIG. 1 shows a transmission electron micrograph of an ultrathin section cut from a molded article comprising the methacrylic resin composition of Example 1. The ultrathin section was cut with a diamond knife and stained with osmium tetraoxide. The lower right micron bar indicates 2 μm.

BEST MODE FOR CARRYING OUT THE INVENTION

The present invention is described in more detail below.

The methacrylic resin composition in the present invention comprises a matrix (A) composed of a methacrylic resin, and a star block copolymer (B), described later, dispersed in the matrix.

[Methacrylic Resin (Matrix (A))]

The methacrylic resin composing the matrix (A) used in the present invention comprises not less than 50% by mass of a methyl methacrylate unit. The content of the methyl methacrylate unit is preferably not less than 80% by mass, and more preferably not less than 90% by mass.

Examples of monomer units other than the methyl methacrylate unit include those of non-crosslinkable monomers having only one alkenyl group in a molecule, such as methyl acrylate, ethyl acrylate, butyl acrylate, ethyl methacrylate, butyl methacrylate, acrylamide, methacrylamide, acrylonitrile, methacrylonitrile, styrene, α-methylstyrene.

[Star Block Copolymer (B)]

The star block copolymer (B) used in the present invention comprises a polymer block (a) composed of a (meth) acrylic acid alkyl ester unit, and a polymer block (b) composed of a conjugated diene compound unit. Note that the term "(meth) acryl" means both of "methacryl" and "acryl". The star block copolymer (B) is used as a resin modifier.

The star block copolymer contains a copolymer in which a plurality of arm polymer blocks are linked together by a group (a coupling agent residue) derived from a polyfunctional monomer, polyfunctional coupling agent and so on.

Arm polymer blocks composing the star block copolymer (B) are not limited by the binding mode as long as they have a polymer block (a) (hereinafter also simply referred to as (a)) and/or a polymer block (b) (hereinafter also simply referred to as (b)). Specific and preferable examples include those comprising a polymer block (a) and polymer block (b) in combination, such as (a)-(b) type diblock copolymers, (a)-(b)-(a) type triblock copolymers, (b)-(a)-(b) type triblock copolymers, (a)-(b)-(a)-(b) type tetrablock copolymers, and (a)-(b) multiblock copolymers containing tetra or more blocks. A plurality of arm polymer blocks composing the star block copolymer (B) may be the same type of block copolymer or different types of block copolymers.

Particularly, the star block copolymer (B) suitable for the present invention is represented by the chemical structural formula:

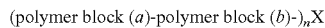

(polymer block (a)-polymer block (b)-)$_n$X wherein X is a coupling agent residue, and n is number greater than 2.

The star block copolymer (B) suitable for the present invention has a number average molecular weight, in terms of polystyrene measured by GPC, satisfying the inequality:

[the number average molecular weight of the star block copolymer]>2×[the number average molecular weight of the arm polymer block].

Note that the ratio of [the number average molecular weight of the star block copolymer] to [the number average molecular weight of the arm polymer block] is also referred to as the number of arms.

A number average molecular weight of the star block copolymer in the range more than twice the number average molecular weight of the arm polymer block increases the mechanical strength against shear of the particles of star block copolymer (B) dispersed in the methacrylic resin, and thus desired impact resistance can be obtained. However, star block copolymers having a number average molecular weight more than 100 times the number average molecular weight of the arm polymer block are difficult to synthesize. For this reason, an industrially preferable number average molecular weight of the star block copolymer (B) is 2 to 100 times, more preferably 2.5 to 50 times, and even more preferably 3 to 10 times the number average molecular weight of the arm polymer block. Note that the star block copolymer (B) used in the present invention may contain arm polymer blocks that are not linked together by a coupling agent residue.

In the suitable star block copolymer (B) used in the present invention, the glass transition temperature of the polymer block (a) and/or the polymer block (b) is preferably 0° C. or lower, and more preferably −10° C. or lower.

The polymer block (a) composing the star block copolymer (B) is composed of a (meth)acrylic acid alkyl ester unit. As methacrylic acid alkyl esters, methyl methacrylate, ethyl methacrylate, butyl methacrylate, cyclohexyl methacrylate, and the like are mentioned. As acrylic acid alkyl esters, methyl acrylate, ethyl acrylate, n-butyl acrylate, i-butyl acrylate, 2-ethylhexyl acrylate, and the like are mentioned. These can be used as single or in combination of two or more. Among them, monomers that produce a polymer block (a) having a glass transition temperature (Tg) of 0° C. or less are preferable, n-butyl acrylate and/or 2-ethylhexyl acrylate are more preferable, and n-butyl acrylate is particularly preferable.

The polymer block (b) composing the star block copolymer (B) is composed of a conjugated diene compound unit. As conjugated diene compounds, 1,3-butadiene, isoprene, pentadiene, 2,3-dimethylbutadiene, and the like are mentioned. These can be used as single or in combination of two or more. Among them, monomers that produce a polymer block (b) having a glass transition temperature (Tg) of 0° C. or less are preferable, 1,3-butadiene and/or isoprene are more preferable, and 1,3-butadiene is particularly preferable in terms of versatility, economy, and handleability.

Conjugated diene compounds include those which undergo 1,4-addition polymerization and those which undergo 1,2- or 3,4-addition polymerization. 1,4-addition polymerization of conjugated diene compounds gives one having a carbon-carbon double bond in the main chain of the molecule. 1,2- or 3,4-addition polymerization of conjugated diene compounds gives one having a vinyl group bonded to the main chain of the molecule (side chain vinyl bond). The carbon-carbon double bond in the main chain of the molecule and/or the vinyl group bonded to the main chain of the molecule are the origin of graft reaction or crosslinking reaction. The proportion of 1,2- or 3,4-addition polymerization of the conjugated diene compound can be increased by adding polar compounds such as ethers to the reaction system.

The polymer block (b) may be partially hydrogenated with the above-described carbon-carbon double bond in the main chain of the molecule and/or the vinyl group bonded to the main chain of the molecule. From the viewpoint of maintaining the effect of the present invention, the ratio of hydrogenation of the polymer block (b) is preferably less than 70 mol %, and more preferably less than 50 mol %. Hydrogenation can be carried out in any manner. For example, it can be achieved using the method disclosed in Japanese Patent Examined No. 5-20442.

The mass ratio of polymer block (a) and polymer block (b) is not limited. However, when the total mass of the polymer block (a) and polymer block (b) is 100% by mass, the amount of polymer block (a) is usually 45 to 75% by mass, and preferably 50 to 70% by mass, whereas the amount of polymer block (b) is usually 25 to 55% by mass, and preferably 30 to 50% by mass.

The refractive index of the star block copolymer (B) is not limited. However, when transparency is required for the methacrylic resin composition in the present invention, the refractive index of the star block copolymer (B) is preferably equal to that of the matrix (A). Specifically, the refractive index of the star block copolymer (B) is preferably 1.48 to 1.50, and more preferably 1.485 to 1.495.

The method of producing the star block copolymer (B) used in the present invention is not limited as long as it can produce star block copolymers that satisfy the requirement of the present invention for the chemical structure, and methods according to known procedures can be used. As a method for obtaining star block copolymers with a narrow molecular weight distribution, generally, a method of performing living polymerization of monomer, which is a constitutional unit, can be employed. Examples of processes of such living polymerization include a method in which polymerization is performed using an organic rare earth metal complex as a polymerization initiator; a method in which anionic polymerization is performed using an organoalkali metal compound as a polymerization initiator, in the presence of a mineral acid salt of an alkali metal or an alkaline earth metal; a method in which anionic polymerization is performed using an organoalkali metal compound as a polymerization initiator, in the presence of an organoaluminum compound; atom transfer radical polymerization (ATRP) method; and so on.

Among these producing methods, the method in which anionic polymerization is performed using an organoalkali metal compound as a polymerization initiator, in the presence of an organoaluminum compound is preferable in terms of the capability of producing star block copolymers with a narrower molecular weight distribution, few residual monomers, practicability under relatively mild temperature conditions, and smaller environmental impact (mainly the power consumption of refrigerators necessary for the control of polymerization temperature) in industrial production.

In the anionic polymerization, an organoalkali metal compound is usually used as a polymerization initiator. Examples of organoalkali metal compounds include organolithium compounds such as methyllithium, ethyllithium, n-propyllithium, isopropyllithium, n-butyllithium, sec-butyllithium, isobutyllithium, tert-butyllithium, n-pentyllithium, n-hexyllithium, tetramethylene dilithium, pentamethylene dilithium, hexamethylene dilithium, and like alkyllithiums and alkyldilithiums; phenyl lithium, m-tolyl lithium, p-tolyl lithium, xylyl lithium, lithium naphthalene, and like aryllithiums and aryldilithiums; benzyl lithium, diphenylmethyl lithium, trityl lithium, 1,1-diphenyl-3-methylpentyllithium, α-methylstyryllithium, dilithium generated by the reaction of diisopropenylbenzene and butyllithium, and like aralkyllithiums and aralkyldilithiums; lithium dimethylamide, lithium diethylamide, lithium diisopropylamide, and like lithium amides; methoxylithium, ethoxylithium, n-propoxylithium, isopropoxylithium, n-butoxylithium, sec-butoxylithium, tert-butoxylithium, pentyloxylithium, hexyloxylithium, heptyloxylithium, octyloxylithium, phenoxylithium, 4-methylphenoxylithium, benzyloxylithium, 4-methylbenzyloxylithium, and like lithium alkoxides. These may be used as single or in combination of two or more.

Examples of organoaluminum compounds used in the above anionic polymerization include those represented by the following formula:

wherein $R^1$, $R^2$, and $R^3$ independently represent an alkyl group which may have a substituent, a cycloalkyl group which may have a substituent, an aryl group which may have a substituent, an aralkyl group which may have a substituent, an alkoxyl group which may have a substituent, an aryloxy group which may have a substituent, or an N,N-disubstituted amino group; or $R^1$ is any one of the above groups, and $R^2$ and $R^3$ are together an arylenedioxy group which may have a substituent.

Specific examples of organoaluminum compounds represented by the above formula include trimethylaluminum, triethylaluminum, tri-n-butylaluminum, tri-s-butylaluminum, tri-t-butylaluminum, triisobutylaluminum, tri-n-hexylaluminum, tri-n-octylaluminum, tri-2-ethylhexylaluminum, triphenylaluminum, and like trialkylaluminums; dimethyl(2,6-di-tert-butyl-4-methylphenoxy)aluminum, dimethyl(2,6-di-tert-butylphenoxy)aluminum, diethyl(2,6-di-tert-butyl-4-methylphenoxy)aluminum, diethyl(2,6-di-tert-butylphenoxy)aluminum, diisobutyl(2,6-di-tert-butyl-4-methylphenoxy)aluminum, diisobutyl(2,6-di-tert-butylphenoxy)aluminum, di-n-octyl(2,6-di-tert-butyl-4-methylphenoxy)aluminum, di-n-octyl(2,6-di-tert-butylphenoxy)aluminum, and like dialkylphenoxyaluminums; methylbis(2,6-di-tert-butyl-4-methyl-phenoxy) aluminum, methylbis(2,6-di-tert-butylphenoxy) aluminum, ethyl[2,2'-methylenebis(4-methyl-6-tert-butylphenoxy)]aluminum, ethylbis(2,6-di-tert-butyl-4-methylphenoxy)aluminum, ethylbis(2,6-di-tert-butylphenoxy)aluminum, ethyl[2,2'-methylenebis(4-methyl-6-tert-butylphenoxy)]aluminum, isobutylbis(2,6-di-tert-butyl-4-methylphenoxy) aluminum, isobutylbis(2,6-di-tert-butylphenoxy) aluminum, isobutyl[2,2'-methylenebis(4-methyl-6-tert-butylphenoxy)] aluminum, n-octylbis(2,6-di-tert-butyl-4-methylphenoxy) aluminum, n-octylbis(2,6-di-tert-butylphenoxy)aluminum, n-octyl[2,2'-methylenebis (4-methyl-6-tert-butylphenoxy)] aluminum, and like alkyldiphenoxyaluminums; methoxybis (2,6-di-tert-butyl-4-methylphenoxy)aluminum, methoxybis (2,6-di-tert-butylphenoxy)aluminum, methoxy[2,2'-methylenebis(4-methyl-6-tert-butylphenoxy)]aluminum, ethoxybis(2,6-di-tert-butyl-4-methylphenoxy)aluminum, ethoxybis(2,6-di-tert-butylphenoxy)aluminum, ethoxy[2,2'-methylenebis(4-methyl-6-tert-butylphenoxy)]aluminum, isopropoxybis(2,6-di-tert-butyl-4-methylphenoxy)aluminum, isopropoxybis(2,6-di-tert-butylphenoxy)aluminum, isopropoxy[2,2'-methylenebis (4-methyl-6-tert-butylphenoxy)]aluminum, tert-butoxybis(2,6-di-tert-butyl-4-methylphenoxy) aluminum, tert-butoxybis(2,6-di-tert-butylphenoxy) aluminum, tert-butoxy[2,2'-methylenebis(4-methyl-6-tert-butylphenoxy)]aluminum, and like alkoxydiphenoxyaluminums; tris(2,6-di-tert-butyl-4-methylphenoxy)aluminum, tris(2,6-diphenylphenoxy) aluminum, and like triphenoxyaluminums; and so on.

These may be used singly or in combination of two or more. Among these organoaluminum compounds, isobutylbis(2,6-di-tert-butyl-4-methylphenoxy) aluminum, isobutylbis(2,6-di-tert-butylphenoxy) aluminum, and isobutyl[2,2'-methylenebis(4-methyl-6-tert-butylphenoxy)]aluminum are preferable in that they can be easily handled, and that anionic-polymerization reaction can proceed under relatively mild temperature conditions, without inactivation.

For stability of polymerization reaction, dimethyl ether, dimethoxyethane, diethoxyethane, 12-crown-4, and like ethers; triethylamine, N,N,N',N'-tetramethylethylenediamine, N,N,N',N'',N''-pentamethyldiethylenetriamine, 1,1,4,7,10,10-hexa-methyltriethylenetetramine, pyridine, 2,2'-dipyridyl, and like nitrogen-containing compounds are allowed to coexist in the reaction system, as needed, during the anionic polymerization.

The star block copolymer (B) in the present invention can be obtained, for example, by a method in which a small amount of polyfunctional monomers, polyfunctional coupling agents, or the like, are added to the anionic-polymerization reaction system and polymerized.

The polyfunctional monomer is a compound having two or more ethylenically unsaturated groups. Specific examples include allyl methacrylate, ethylene glycol dimethacrylate, 1,3-butylene glycol dimethacrylate, divinylbenzene, 1,6-hexanediol diacrylate, etc.

The polyfunctional coupling agent is a compound having three or more reactive groups. Specific examples include trichloromethylsilane, tetrachlorosilane, butyltrichlorosilane, bis(trichlorosilyl)ethane, tetrachlorotin, butyltrichlorotin, tetrachloro germanium, etc.

In terms of enhancing the impact resistance of the obtained methacrylic resin composition, the number average molecular weight (Mn) of the whole star block copolymer (B) used in the present invention is preferably 5,000 to 1,000,000, more preferably 10,000 to 800,000, and even more preferably 10,000 to 500,000.

The star block copolymer (B) as thus far described is useful as a resin modifier, and it is particularly useful as a modifier for methacrylic resin.

In the methacrylic resin composition of the present invention, the star block copolymer (B) forms domains which are dispersed in the matrix (A).

The amount of the star block copolymer (B) is preferably 1 to 80 parts by mass, more preferably 2 to 30 parts by mass, and particularly preferably 4 to 20 parts by mass, based on 100 parts by mass of the matrix (A) composed of methacrylic resin.

The domain size (the average diameter of domains) is not limited, but, preferably 0.05 to 2.0 μm, and more preferably 0.1 to 1.0 μm. A smaller average diameter of domains tends to reduce impact resistance, whereas a larger average diameter of domains tends to decrease rigidity as well as transparency. The structure and average diameter of domains can be observed in a transmission electron micrograph of a section cut by ultramicrotomy. FIG. 1 is a transmission electron micrograph showing an example of methacrylic resin composition of the present invention. As shown in the micrograph, salami-like domains (dispersed phase) are dispersed in the matrix.

The methacrylic resin composition in the present invention is not limited by the production process thereof. For example, it can be obtained in such a manner that the star block copolymer (B) is added to a methacrylic resin composing the matrix (A), and the mixture is melted and kneaded in a single or twin screw melt extruder. In the present invention, the methacrylic composition can be preferably obtained by the production process (in-situ process) as described below.

According to the in-situ process, a substance that forms a continuous phase (matrix) or dispersed phase (domain) is generated in the presence of a substance that forms a dispersed phase or continuous phase to directly produce a composition comprising a continuous phase and a dispersed phase.

The present invention preferably employs a process of generating the methacrylic resin (A), which forms a continuous phase, in the presence of the star block copolymer (B), which forms a dispersed phase.

More specifically, in this process, 100 parts by mass of a monomer mixture (A') comprising 50 to 100% by mass of methyl methacrylate and 0 to 50% by mass of other vinyl monomer copolymerizable with methyl methacrylate is polymerized in the presence of 1 to 80 parts by mass of the star block copolymer (B) comprising a polymer block (a) composed of a (meth) acrylic acid alkyl ester unit and a polymer block (b) composed of a conjugated diene compound unit.

In order to obtain the methacrylic resin composition, in which the star block copolymer (B) is dispersed in the matrix (A), it is preferable to polymerize a monomer mixture (A') solution containing the star block copolymer (B) in a dissolved state, by stirring the solution so that shear is applied. By performing the polymerization reaction while applying shear to the monomer mixture (A') solution containing the star block copolymer (B), phase inversion occurs between the star block copolymer (B) and the methacrylic resin (A) obtained by polymerization of the monomer mixture (A'). As a result, the monomer mixture (A') solution phase containing the methacrylic resin (A) in a dissolved state becomes the continuous phase (matrix), whereas the monomer mixture (A') solution phase containing the star block copolymer (B) in a dissolved state becomes the dispersed phase (domain). The polymerization conversion of the monomer, at which phase inversion occurs, can be controlled by the volume ratio of the star block copolymer (B) and matrix (A), the molecular weight of the star block copolymer (B), and a graft product with the star block copolymer (B). Further, when a solvent is added, the polymerization conversion can be controlled by the amount and type of the solvent.

As a polymerization process, bulk polymerization or solution polymerization is preferable from an early stage of polymerization until the onset of phase inversion. When polymerization is performed by bulk polymerization or solution polymerization, methacrylic resins are generated in the monomer mixture (A') solution of the star block copolymer (B) at an early stage of polymerization. In bulk polymerization or solution polymerization, greater shear force caused by stirring is applied to the star block copolymer (B). Phase separation occurs with increase in the polymerization conversion, and then phase inversion occurs between the monomer mixture (A') solution phase of the generated methacrylic resin and the monomer mixture (A') solution phase of the star block copolymer (B). That is, the solution phase of the methacrylic resin turns to the continuous phase, while the solution phase of the star block copolymer (B) turns to the dispersed phase. As devices for performing bulk polymerization or solution polymerization, a tank reactor equipped with a stirrer, a tube reactor equipped with a stirrer, a tube reactor capable of static stirring, and the like, can be employed. One or more of these devices may be used, and two or more different reactors may be used in combination. Moreover, polymerization may be performed by either a batch process or a continuous process.

The size of the dispersed phase can be controlled by various factors. For example, when using a reactor equipped with a stirrer, the size can be controlled by the stirring rotation speed and other factors; and when using a static stirring reactor represented by a column reactor, the size can be controlled by the linear velocity of the reaction mixture, the viscosity of the polymerization system, the graft ratio to the star block copolymer (B) before phase inversion, and other factors. After phase inversion occurs, bulk polymerization or solution polymerization is applicable, and in addition, suspension polymerization is also applicable.

In a suitable process for producing the methacrylic resin composition of the present invention, 100 parts by mass of a monomer mixture (A') comprising 50 to 100% by mass of methyl methacrylate and 0 to 50% by mass of other vinyl monomer copolymerizable with the methyl methacrylate is polymerized by bulk polymerization or solution polymerization in the presence of 1 to 80 parts by mass of the star block copolymer (B) comprising a polymer block (a) composed of a (meth) acrylic acid alkyl ester unit and a polymer block (b) composed of a conjugated diene compound unit, until the polymerization conversion of the monomer reaches 70% by mass or more.

More specifically, in such a process, 1 to 80 parts by mass of the star block copolymer (B) comprising a polymer block (a) composed of a (meth) acrylic acid alkyl ester unit and a polymer block (b) composed of a conjugated diene compound unit is dissolved in a solution containing 0 to 100 parts by mass of a solvent and 100 parts by mass of a monomer mixture (A') comprising methyl methacrylate in an amount of 50 to 100% by mass, preferably 80 to 100% by mass, and more preferably 90 to 100% by mass, and other vinyl monomer copolymerizable with the methyl methacrylate in an amount of 0 to 50% by mass, preferably 0 to 20% by mass, and more preferably 0 to 10% by mass; and then the mixed solution is polymerized by bulk polymerization or solution polymerization until the polymerization conversion of the monomer reaches 70% by mass or more.

The method of dissolving the star block copolymer (B) in a solution containing a monomer mixture (A'), and a solvent if necessary, is not limited as long as it can uniformly dissolve the star block copolymer (B). For example, the star block copolymer (B) can be dissolved by heating the monomer mixture (A'), and optionally a solvent, to about 30 to 60° C. and stirring.

In the production process of the present invention, the star block copolymer (B) is used in an amount of 1 to 80 parts by mass, preferably 2 to 30 parts by mass, and more preferably 4 to 20 parts by mass, based on 100 parts by mass of the monomer mixture (A'). A less amount of the star block copolymer (B) tends to reduce the impact resistance of the methacrylic resin composition. Conversely, a larger amount of the star block copolymer (B) tends to decrease elastic modulus and rigidity; additionally, phase inversion hardly occurs, making uniform dispersion of the star block copolymer (B) in the matrix (A) difficult.

Examples of other vinyl monomers copolymerizable with methyl methacrylate include methyl acrylate, ethyl acrylate, butyl acrylate, ethyl methacrylate, butyl methacrylate, acrylamide, methacrylamide, acrylonitrile, methacrylonitrile, styrene, α-methylstyrene, and like non-crosslinkable monomers having only one alkenyl group in a molecule.

Solvents for use in solution polymerization are not limited as long as they can dissolve the monomer mixture (A') containing not less than 50% by mass of methyl methacrylate, the methacrylic resin (A) obtained from the monomer mixture, and the star block copolymer (B). For example, benzene, toluene, ethylbenzene, and like aromatic hydrocarbons can be mentioned. Moreover, a mixture of two or more solvents may be used, as needed. When a mixed solvent, which can dissolve the monomer mixture (A'), the methacrylic resin (A), and the star block copolymer (B), is used, it may also contain solvents that cannot dissolve the monomer mixture (A'), the methacrylic resin (A), or the star block copolymer (B). For example, alcohols such as methanol, ethanol, and butanol; ketones such as acetone, and methyl ethyl ketone; hydrocarbons such as hexane; and alicyclic hydrocarbons such as cyclohexane may be contained in the mixed solvent.

The suitable amount of solvent usable in the present invention is in the range of 0 to 90% by mass, when the total amount of a mixture of methyl methacrylate, other vinyl monomer copolymerizable with the methyl methacrylate, and the solvent is 100% by mass.

Polymerization reaction of the monomer mixture containing not less than 50% by mass of methyl methacrylate is accompanied by graft reaction or crosslinking reaction originating from the carbon-carbon unsaturated bond and the like in the star block copolymer (B). Particularly, crosslinking reaction mainly proceeds at the time of a higher polymerization conversion of the monomer, and thus, in the present invention, polymerization can be performed until the polymerization conversion of the monomer reaches 70% by mass or more, and preferably 80% by mass or more.

At a monomer polymerization conversion of 70% by mass or more, the impact resistance and appearance of molded articles obtained from the methacrylic resin composition can be enhanced.

Polymerization initiators to be used in the production process of the present invention are not limited as long as they generate reactive radicals. Examples include azo compounds such as azobis-isobutyronitrile, and azobiscyclohexylcarbonitrile; organic peroxides such as benzoyl peroxide, t-butyl peroxybenzoate, di-t-butyl peroxide, dicumyl peroxide, 1,1-bis(t-butylperoxy)3,3,5-trimethylcyclohexane, t-butylperoxyisopropyl carbonate, 1,1-bis(t-butyl-peroxy)cyclohexane, di-t-butyl peroxide, and t-butyl peroxybenzoate. These can be used as single or in combination of two or more. Moreover, the amount of the polymerization initiator added, the method of addition, and other conditions are not limited, and are suitably determined according to the purposes.

During the polymerization of the above monomer mixture comprising not less than 50% by mass of methyl methacrylate, chain transfer agents represented by alkyl mercaptans, etc., may be added to the reaction system, as required.

Examples of alkyl mercaptans include n-dodecyl mercaptan, t-dodecyl mercaptan, 1,4-butanedithiol, 1,6-hexanedithiol, ethylene glycol bisthiopropionate, butanediol bisthioglycolate, butanediol bisthiopropionate, hexanediol bisthioglycolate, hexanediol bisthiopropionate, trimethylolpropane tris-(β-thiopropionate), pentaerythritol tetrakisthiopropionate, etc.

Unreacted monomer and solvent are usually removed after the termination of polymerization. Although the removal method is not limited, heating devolatilization is preferable. As a devolatilization process, an equilibrium flash process or an adiabatic flash process can be mentioned. Particularly in an adiabatic flash process, devolatilization is preferably performed at a temperature of 200 to 300° C., and more preferably 220 to 270° C. At less than 200° C., devolatilization requires a long time, and insufficient devolatilization may result in poor appearance, such as silver, of a molded article. Conversely, at more than 300° C., the methacrylic resin composition may be colored due to oxidation, burn, etc.

The methacrylic resin composition in the present invention may contain, as required, antioxidants, UV absorbers, lubricants, parting agents, antistatic agents, flame retardants, dyes or pigments, etc. Further, the methacrylic resin composition in the present invention can be used in mixture with other resins, such as methacrylic resins, AS resins, ABS resins, AES resins, AAS resins, MS resins, MBS resins, styrene resins, high-impact polystyrene resins, vinyl chloride resins, etc.

Additionally, ordinary additives including other modifiers, such as multi-layered acrylic rubber particles, can be effectively used in the methacrylic resin composition in the present invention. In this case, such modifiers are preferably added in an amount less than ordinary level, for improvement of some properties.

Toughened molded articles can be obtained by molding the methacrylic resin composition in the present invention. Examples of molding processes for obtaining such molded articles include conventionally-known hot-melt molding such as injection molding, compression molding, extrusion molding, vacuum molding, etc.

Due to excellent weather resistance and transparency as well as impact resistance, the methacrylic resin composition in the present invention is applicable to various molded parts. Examples of applications of the methacrylic resin composition include advertising pillars, standing signboard, side signboards, transom signboards, roof signboards, and like signboard parts; showcases, partition panels, store displays, and like display parts; fluorescent covers, mood lighting covers, lamp shades, luminous ceilings, luminous walls, chandeliers, and like illumination parts; pendants, mirrors, and like interior parts; doors, domes, safety window glasses, partitions, stairway wainscot, balcony wainscot, roofs of leisure buildings, and like structural parts; airplane windshields, pilot's visors, motorcycles, motorboat windshields, bus sun visors, vehicle side visors, rear visors, head wings, headlight covers, and like transport machine-related parts; nameplates for acoustic imaging, stereo covers, television protective masks, vending machines, and like electronic equipment parts; incubators, X-ray materials, and like medical equipment parts; machine covers, instrument covers, laboratory equipments, ruler, dial plates, observation windows, and like equipment-related parts; liquid crystal protection plates, light guide plates, light guide films, Fresnel lenses, lenticular lenses, front plates and diffuser plates for various displays, and like optical-related parts; traffic signs, guide plates, road mirrors, soundproof walls, and like traffic-related parts; surface materials for automobile interiors, surface materials for mobile phones, marking films, and like film components; lid materials and control panels of washing machines, top panels of rice cookers, and like home electronics components; and greenhouses, large water tanks, box water tanks, clock panels, bathtubs, sanitary fitments, desk mats, game parts, toys, face protection masks during welding, etc.

EXAMPLES

The present invention is described in more detail below with reference to EXAMPLES; however, the present invention is not limited thereto.

Instruments and methods of measurement used in PRODUCTION EXAMPLES, EXAMPLES, and COMPARATIVE EXAMPLES are as follows.

(1) Measurement of Number Average Molecular Weight (Mn), Weight Average Molecular Weight (Mw), Molecular Weight Distribution (Mw/Mn), and Production Ratio of Block Copolymer by Gel Permeation Chromatography (GPC)

Instrument: gel permeation chromatograph (HLC-8020; manufactured by Tosoh Corporation)

Column: serially connected TSKgel GMHXL, G4000HXL, and G5000HXL (manufactured by Tosoh Corporation)

Eluent: tetrahydrofuran

Eluent flow rate: 1.0 ml/min.

Column temperature: 40° C.

Detection method: differential refractive index (RI) detector

Calibration curve: prepared using standard polystyrene (2) Measurement of Polymerization Conversion of Feed Monomer by Gas Chromatography (GC)

Instrument: gas chromatograph (GC-14A; manufactured by Shimadzu Corporation)

Column: INERT CAP 1 (df=0.4 μm, 0.25 mm I.D.×60 m; manufactured by GL Sciences Inc.)

Analysis condition: injection temperature: 180° C., detector temperature: 180° C., 60° C. (maintained for 0 minutes) →temperature increase rate: 10° C./min.→200° C. (maintained for 10 minutes)

(3) Morphological Evaluation of Molded Article

An ultrathin section was cut from a molded article using a diamond knife. The ultrathin section was stained with osmium tetraoxide (the polybutadiene phase was stained). A photograph of its observed image was taken with transmission electron microscope. Morphological evaluation was performed using this photograph.

(4) Evaluation of Impact Resistance of Molded Article

According to ISO 179-1eA, Charpy impact strength was measured on notched specimens.

(5) Measurement of Flexural Modulus of Molded Article

According to ISO 178, flexural modulus was measured.

(6) Evaluation of Transparency of Molded Article

According to ISO 14782, haze of a 1-mm thick sheet was measured.

(7) Molecular Structure Analysis of Block Copolymer by Nuclear Magnetic Resonance Spectrum ($^1$H-NMR Spectrum)

Instrument: nuclear magnetic resonance spectrometer (JNM-LA400; manufactured by JEOL Ltd.)

Solvent: heavy chloroform (8) Vinyl Bond Content

A block copolymer was dissolved in heavy chloroform to obtain a test solution. The test solution was analyzed by $^1$H-NMR (JNM-LA400; a nuclear magnetic resonance spectrometer manufactured by JEOL Ltd.). The integrated intensities of the chemical shift at 4.7-5.2 ppm (hereinafter referred to as signal $C_0$) for 1,2-vinyl proton (=$CH_2$) and the chemical shift 5.2-5.8 ppm (hereinafter referred to as signal $D_0$) for vinyl proton (=CH—) were determined, and the side chain vinyl bond content $V_0$ [%] was calculated by the following equation:

$$V_0=[(C_0/2)/\{C_0/2+(D_0-C_0/2)/2\}]\times 100$$

(9) Melting and Kneading of Methacrylic Resin Composition

Using a Labo Plastomill/R60 mixer (manufactured by Toyo Seiki Seisaku-sho, Ltd.), kneading was performed under conditions of 230° C., 80 rpm, and 3 minutes.

(10) Glass Transition Temperature (Tg)

As the glass transition temperature (Tg) of poly n-butyl acrylate (hereinafter referred to as "PBA") used as the polymer block (a), the value (−49° C.) described in "POLYMER HANDBOOK FOURTH Edition, page VI/199, Wiley Interscience, New York, 1998" was used.

As the glass transition temperature (Tg) of the poly 1,3-butadiene (hereinafter referred to as "PBD") used as the polymer block (b), the value derived from the relationship between the 1,2-vinyl bond content and Tg, described in "ANIONIC POLYMERIZATION, page 434, MARCEL DEKKER, Inc. 1996" was used. The glass transition temperature (Tg) of the styrene polymer block in the styrene-butadiene block copolymer used in COMPARATIVE EXAMPLES was 100° C.

(11) Refractive Index ($n_d$)

According to the description in "POLYMER HANDBOOK FOURTH Edition, page VI/571-582, Wiley Interscience, New York, 1998", as refractive index of homopolymer, poly n-butyl acrylate is 1.466, poly 1,3-butadiene is 1.515, and polystyrene is 1.59. The refractive index was calculated by the additive property rule in accordance with a copolymerization composition ratio.

Example 1

Production of Resin Modifier Comprising Star Block Copolymer (B-1)

(1) Into a 1.5-liter autoclave container equipped with a stirrer, 694 ml of toluene and 0.018 ml of 1,2-dimethoxyethane were fed, and nitrogen purge was performed for 20 minutes. And, 2.77 ml of a cyclohexane solution of sec-butyllithium at a concentration of 1.3 mol/l was added thereto, and then 128 ml of 1,3-butadiene was added. The mixture was reacted at 30° C. for 1.5 hours to obtain a reaction mixture containing 1,3-butadiene polymer. A part of the obtained reaction mixture was sampled and analyzed. As a result, the 1,3-butadiene polymer in the reaction mixture had a number average molecular weight (Mn) of 36,000, a molecular weight distribution (Mw/Mn) of 1.06, and a side chain vinyl bond content of 49 mol %. The 1,3-butadiene polymer (polymer block (b)) had a glass transition temperature of −60° C.

(2) The reaction mixture obtained in the above step (1) was cooled to −30° C. Then, 60 ml of a toluene solution containing 0.6 mol/l of isobutylbis(2,6-di-t-butyl-4-methylphenoxy)aluminum, and 13.9 ml of 1,2-dimethoxyethane were added, and the mixture was homogenized by stirring for 10 minutes.

(3) Then, 134 ml of n-butyl acrylate was added to the solution obtained in the above step (2) while vigorously stirring. The mixture was polymerized at −30° C. for 1 hour. A part of the obtained reaction mixture was sampled, and the molecular weight was analyzed by GPC (polystyrene standard). The result revealed that butadiene-n-butyl acrylate diblock copolymer (arm polymer block) in the reaction mixture had a number average molecular weight of 85,000, a ratio of weight average molecular weight to number average molecular weight (Mw/Mn) of 1.02, and a refractive index of 1.486. The polymer block (a) obtained by polymerization of n-butyl acrylate had a glass transition temperature of −49° C.

(4) The reaction mixture obtained in the above step (3) was maintained at −30° C. While the reaction mixture was vigorously stirred, 2.4 ml of 1,6-hexanediol diacrylate was added and polymerized for 2 hours. Then, about 1 ml of methanol was added to terminate the polymerization.

(5) The reaction mixture obtained in the above step (4) was added into 8,000 ml of methanol for re-precipitating to produce a star block copolymer (B-1). The yield of the star block copolymer (B-1) was approximately 100%. The star block copolymer (B-1) had a number average molecular weight (Mn) of 330,000 (the number of arms=3.88), and Mw/Mn of 1.16. The content of the star block copolymer calculated from GPC area ratio was 92% by mass. Moreover, the star block copolymer (B-1) contained, as an arm polymer block, a diblock copolymer comprising 40% by mass of a polymer block (b) composed of a 1,3-butadiene unit and 60% by mass of a polymer block (a) composed of an n-butyl acrylate unit. The refractive index of the star block copolymer (B-1) was 1.486. Table 1 shows the properties of the star block copolymer (B-1). Note that BA means n-butyl acrylate and BD means 1,3-butadiene in the table.

Example 2

Production of Resin Modifier Comprising Star Block Copolymer (B-2)

A star block copolymer (B-2) was obtained in the same manner as in EXAMPLE 1 except that 1,2-dimethoxyethane was not added, that the amount of 1,3-butadiene was changed to 112 ml, and that the amount of n-butyl acrylate was changed to 144 ml. The obtained star block copolymer (B-2) comprised 35% by mass of a 1,3-butadiene unit and 65% by mass of an n-butyl acrylate unit. The polymer block (b) composed of 1,3-butadiene had a vinyl bond content of 10 mol % and a glass transition temperature of –95° C. The polymer block (a) composed of n-butyl acrylate had a glass transition temperature of –49° C. The butadiene-n-butyl acrylate diblock copolymer (arm polymer block) had a number average molecular weight of 66,000 and a ratio of weight average molecular weight to number average molecular weight (Mw/Mn) of 1.05. Moreover, the star block copolymer had a number average molecular weight (Mn) of 374,000 (the number of arms=5.67), and Mw/Mn of 1.18. The content of the star block copolymer calculated from GPC area ratio was 90% by mass. The refractive index of the star block copolymer (B-2) was 1.483. Table 1 shows the properties of the star block copolymer (B-2).

Example 3

Production of Resin Modifier Comprising Star Block Copolymer (B-3)

A star block copolymer (B-3) was obtained in the same manner as in EXAMPLE 2 except that the amount of 1,3-butadiene was changed to 144 ml, and that the amount of n-butyl acrylate was changed to 122 ml. The obtained star block copolymer (B-3) comprised 45% by mass of a 1,3-butadiene unit and 55% by mass of an n-butyl acrylate unit. The polymer block (b) composed of 1,3-butadiene had a vinyl bond content of 10 mol % and a glass transition temperature of –95° C. The polymer block (a) composed of n-butyl acrylate had a glass transition temperature of –49° C. The butadiene-n-butyl acrylate diblock copolymer (arm polymer block) had a number average molecular weight of 60,000 and a ratio of weight average molecular weight to number average molecular weight (Mw/Mn) of 1.04. Moreover, the star block copolymer had a number average molecular weight (Mn) of 411,000 (the number of arms=6.85), and Mw/Mn of 1.18. The content of the star block copolymer calculated from GPC area ratio was 90% by mass. The refractive index of the star block copolymer (B-3) was 1.488. Table 1 shows the properties of the star block copolymer (B-3).

Comparative Example 1

Production of Resin Modifier Comprising Diblock Copolymer (B-4)

A reaction mixture was obtained by performing the same operation as in the steps (1)-(3) of EXAMPLE 1. The reaction mixture was added into 8000 ml of methanol for re-precipitating to produce a diblock copolymer (B-4). The obtained diblock copolymer (B-4) comprised 40% by mass of a 1,3-butadiene unit and 60% by mass of an n-butyl acrylate unit. The polymer block (b) composed of 1,3-butadiene had a vinyl bond content of 49 mol % and a glass transition temperature of –60° C. The polymer block (a) composed of n-butyl acrylate had a glass transition temperature of –49° C. In the diblock copolymer, the number average molecular weight (Mn) was 85,000, and Mw/Mn was 1.02. The refractive index of the diblock copolymer (B-4) was 1.486. Table 1 shows the properties of the diblock copolymer (B-4).

Comparative Example 2

Production of Resin Modifier Comprising Diblock Copolymer (B-5)

A diblock copolymer (B-5) was obtained in the same manner as in COMPARATIVE EXAMPLE 1 except that 1,2-dimethoxyethane was not added, that the amount of 1,3-butadiene was changed to 112 ml, and that the amount of n-butyl acrylate was changed to 144 ml. The obtained diblock copolymer (B-5) comprised 35% by mass of a 1,3-butadiene unit and 65% by mass of an n-butyl acrylate unit. The polymer block (b) composed of 1,3-butadiene had a vinyl bond content of 10 mol % and a glass transition temperature of –95° C. The polymer block (a) composed of n-butyl acrylate had a glass transition temperature of –49° C. In the diblock copolymer, the number average molecular weight (Mn) was 68,000, and Mw/Mn was 1.05. The refractive index of the diblock copolymer (B-5) was 1.483. Table 1 shows the properties of the diblock copolymer (B-5).

Comparative Example 3

Production of Resin Modifier Comprising Diblock Copolymer (B-6)

A diblock copolymer (B-6) was obtained in the same manner as in COMPARATIVE EXAMPLE 2 except that the amount of 1,3-butadiene was changed to 144 ml, and that the amount of n-butyl acrylate was changed to 122 ml. The obtained diblock copolymer (B-6) comprised 45% by mass of a 1,3-butadiene unit and 55% by mass of an n-butyl acrylate unit. The polymer block (b) composed of 1,3-butadiene had a vinyl bond content of 10 mol % and a glass transition temperature of –95° C. The polymer block (a) composed of n-butyl acrylate had a glass transition temperature of –49° C. In the diblock copolymer, the number average molecular weight (Mn) was 61,000, and Mw/Mn was 1.04. The refractive index of the diblock copolymer (3-6) was 1.488. Table 1 shows the properties of the diblock copolymer (B-6).

TABLE 1

|  | Ex. 1 | Ex. 2 | Ex. 3 | Comp. Ex. 1 | Comp. Ex. 2 | Comp. Ex. 3 |
|---|---|---|---|---|---|---|
| Block copolymer B | B-1 | B-2 | B-3 | B-4 | B-5 | B-6 |
| Binding mode | Star block | Star block | Star block | Diblock | Diblock | Diblock |
| Block (a) component | BA | BA | BA | BA | BA | BA |
| Block (b) component | BD | BD | BD | BD | BD | BD |
| Mass ratio (a)/(b) | 60/40 | 65/35 | 55/45 | 60/40 | 65/35 | 55/45 |
| Tg of block (a) [° C.] | −49 | −49 | −49 | −49 | −49 | −49 |
| Tg of block (b) [° C.] | −60 | −95 | −95 | −60 | −95 | −95 |
| Refractive index nd | 1.486 | 1.483 | 1.488 | 1.486 | 1.483 | 1.488 |

Example 4

Production of Methacrylic Resin Composition
(Solution Polymerization→Solution Polymerization)

In an autoclave equipped with a stirrer and sampling tube, 57 parts by mass of methyl methacrylate, 3 parts by mass of methyl acrylate, and 30 parts by mass of toluene were charged. Then, 10 parts by mass of the star block copolymer (B-1) was added and stirred at 30° C. for 8 hours. Thus, the star block copolymer (B-1) as (meth)acrylic elastomer was uniformly dissolved. Subsequently, 0.03 parts by mass of 1,1-bis(t-butylperoxy)cyclohexane and 0.2 parts by mass of n-dodecyl mercaptan were added and uniformly dissolved. Oxygen was removed by nitrogen from the reaction system, and solution polymerization was carried out at 105° C. for 2.5 hours. The polymerization solution was drawn through the sampling tube to obtain a reaction mixture. The polymerization conversion of the reaction mixture measured by gas chromatography was 60% by mass.

Then, 0.05 parts by mass of di-t-butyl peroxide was added to the polymerization solution, and solution polymerization was carried out at 140° C. for 2 hours to produce a reaction mixture (d-1). The polymerization conversion of the reaction mixture (d-1) measured by gas chromatography was 95% by mass. The reaction mixture (d-1) was vacuum-dried to remove unreacted monomer and toluene. As a result, a methacrylic resin composition (e-1) was obtained.

The dried methacrylic resin composition was hot-pressed to produce 3-mm and 1-mm thick molded articles. Additionally, the dried methacrylic resin composition was kneaded by a Labo Plastomill and hot-pressed to produce 3-mm and 1-mm thick molded articles. Table 2 shows the evaluation results. Moreover, FIG. 1 shows a transmission electron micrograph of the molded article. According to this methacrylic resin composition, the dispersion pattern and particle shape were maintained even after kneading by a Labo Plastomill. Thus, the morphology was not changed.

Examples 5 and 6, and Comparative Examples 4-6

Production of Methacrylic Resin Composition
(Solution Polymerization→Solution Polymerization)

Methacrylic resin compositions (e-2) to (e-6), shown in Table 2, were obtained by performing the same operation as in EXAMPLE 4 except that the star block copolymer (B-1) used in EXAMPLE 4 was changed to the block copolymers (B-2 to B-6) shown in Table 2. The obtained methacrylic resin compositions (e-2) to (e-6) were hot-pressed to produce 3-mm and 1-mm thick molded articles. Additionally, the dried methacrylic resin compositions were kneaded by a Labo Plastomill and hot-pressed to produce 3-mm and 1-mm thick molded articles. Table 2 shows the evaluation results.

Comparative Example 7

A methacrylic resin composition (e-7) was obtained by performing the same operation as in EXAMPLE 4 except that a styrene (ST)-butadiene (BD) block copolymer (Nipol NS-310S, manufactured by Zeon Corporation; styrene content: 22% by mass, side chain vinyl bond content: 17 mol %, number average molecular weight (Mn): 270,000, molecular weight distribution (Mw/Mn): 1.03; hereinafter ST-BD) was used in place of the star block copolymer (B-1) used in EXAMPLE 4.

The obtained methacrylic resin composition (e-7) was hot-pressed to produce 3-mm and 1-mm thick molded articles. Additionally, the dried methacrylic resin composition was kneaded by a Labo Plastomill and hot-pressed to produce 3-mm and 1-mm thick molded articles. Table 2 shows the evaluation results.

TABLE 2

|  | Ex. 4 | Ex. 5 | Ex. 6 | Comp. Ex. 4 | Comp. Ex. 5 | Comp. Ex. 6 | Comp. Ex. 7 |
|---|---|---|---|---|---|---|---|
| Resin composition | e-1 | e-2 | e-3 | e-4 | e-5 | e-6 | e-7 |
| Polymerization solution d | d-1 | d-2 | d-3 | d-4 | d-5 | d-6 | d-7 |
| Polymerization conversion of polymerization solution d | 95 | 95 | 94 | 94 | 94 | 95 | 95 |
| Block copolymer B [parts by mass] | | | | | | | |
| Block copolymer (B-1) | 14.9 | — | — | — | — | — | — |
| Block copolymer (B-2) | — | 14.9 | — | — | — | — | — |
| Block copolymer (B-3) | — | — | 15.1 | — | — | — | — |
| Block copolymer (B-4) | — | — | — | 15.1 | — | — | — |
| Block copolymer (B-5) | — | — | — | — | 15.1 | — | — |
| Block copolymer (B-6) | — | — | — | — | — | 14.9 | — |
| ST-BD block copolymer | — | — | — | — | — | — | 14.9 |

TABLE 2-continued

|  | Ex. 4 | Ex. 5 | Ex. 6 | Comp. Ex. 4 | Comp. Ex. 5 | Comp. Ex. 6 | Comp. Ex. 7 |
|---|---|---|---|---|---|---|---|
| Matrix A [parts by mass] | | | | | | | |
| Methyl methacrylate | 80.8 | 80.8 | 80.7 | 80.7 | 80.7 | 80.8 | 80.8 |
| Methyl acrylate | 4.3 | 4.3 | 4.2 | 4.2 | 4.2 | 4.3 | 4.3 |
| Mass ratio B/A | 15/85 | 15/85 | 15/85 | 15/85 | 15/85 | 15/85 | 15/85 |
| Morphology | Block copolymer B particles dispersed | Block copolymer B particles dispersed | Block copolymer B particles dispersed | Block copolymer B particles dispersed | Block copolymer B particles dispersed | Block copolymer B particles dispersed | ST-BD particles dispersed |
| Particle shape retention[1] | ○ | ○ | ○ | X | X | X | ○ |
| Charpy impact strength [KJ/m$^2$] | 10.2 | 10.4 | 9.2 | 7.5 | 8.0 | 7.3 | 10 |
| Flexural Modulus [MPa] | 2020 | 2030 | 1980 | 2050 | 2060 | 2050 | 1950 |
| Haze [%] | 0.8 | 1.2 | 0.9 | 0.7 | 1.1 | 0.8 | 89.3 |

[1] ○: No change in particle shape before and after Labo Plastomill treatment X: Loss of particle shape after Labo Plastomill treatment

Example 7

Production of Methacrylic Resin Composition (Solution Polymerization→Solution Polymerization)

In an autoclave equipped with a stirrer and sampling tube, 55.9 parts by mass of methyl methacrylate, 2.9 parts by mass of methyl acrylate, and 35 parts by mass of toluene were charged. Then, 6.2 parts by mass of the star block copolymer (B-1) was added and stirred at 30° C. for 8 hours. Thus, the star block copolymer (B-1) as (meth)acrylic elastomer was uniformly dissolved. Subsequently, 0.03 parts by mass of 1,1-bis(t-butylperoxy)cyclohexane and 0.15 parts by mass of n-dodecyl mercaptan were added and uniformly dissolved. Oxygen was removed by nitrogen from the reaction system, and solution polymerization was carried out at 115° C. for 2.5 hours. The polymerization solution was drawn through the sampling tube to obtain a reaction mixture. The polymerization conversion of the reaction mixture measured by gas chromatography was 68 by mass.

Then, 0.05 parts by mass of di-t-butyl peroxide was added to the polymerization solution, and solution polymerization was carried out at 140° C. for 1.5 hours to produce a reaction mixture (d-8). The polymerization conversion of the reaction mixture (d-8) measured by gas chromatography was 95% by mass. The reaction mixture (d-8) was vacuum-dried to remove unreacted monomer and toluene. As a result, a methacrylic resin composition (e-8) was obtained.

The dried methacrylic resin composition (e-8) was hot-pressed to produce 3-mm and 1-mm thick molded articles. Additionally, the dried methacrylic resin composition was kneaded by a Labo Plastomill and hot-pressed to produce 3-mm and 1-mm thick molded articles. Table 3 shows the evaluation results. According to the methacrylic resin composition (e-8), the dispersion pattern and particle shape were maintained even after kneading by a Labo Plastomill. Thus, the morphology was not changed.

TABLE 3

|  | Ex. 7 | Comp. Ex. 8 | Comp. Ex. 9 |
|---|---|---|---|
| Resin composition | e-8 | e-9 | |
| Polymerization solution d | d-8 | — | GR-100 |
| Polymerization conversion of polymerization solution d | 95 | — | |
| Block copolymer B [parts by mass] | | | |
| Block copolymer (B-1) | 10 | — | |
| Block copolymer (B-4) | — | 10 | |
| Matrix A [parts by mass] | | | |
| Methyl methacrylate | 85.5 | 85.5 | |
| Methyl acrylate | 4.5 | 4.5 | |
| Mass ratio B/A | 10/90 | 10/90 | |
| Morphology | Block copolymer B particles dispersed | PMMA particles dispersed | Multi-layered acrylic rubber particles dispersed |
| Particle shape retention[1] | ○ | ○ | ○ |
| Charpy impact strength [KJ/m$^2$] | 6.3 | 1.3 | 5.9 |
| Flexural Modulus [MPa] | 2400 | 1300 | 1650 |
| Haze [%] | 0.6 | — | 1.2 |

[1] ○: No change in particle shape before and after Labo Plastomill treatment X: Loss of particle shape after Labo Plastomill treatment

Comparative Example 8

Suspension Polymerization

Under a nitrogen atmosphere, 85.5 parts by mass of methyl methacrylate, 4.5 parts by mass of methyl acrylate, and 10 parts by mass of the block copolymer (B-4) were added to a polymerization reactor equipped with a stirrer, cooling tube, and dropping funnel. The mixture was stirred at 30° C. for 8 hours to uniformly dissolve the block copolymer (B-4). Subsequently, 0.4 parts by mass of 1,1,3,3-tetramethylbutylperoxy 2-ethylhexanoate and 0.3 parts by mass of n-dodecyl mercaptan were added and uniformly dissolved. Then, 10 parts by mass of a 3% aqueous solution of methyl hydroxypropylcellulose and 125 parts by mass of distilled water were added, and stirred under a nitrogen atmosphere to enter a suspended state. The suspension was heated to 80° C., and subjected to suspension polymerization from the beginning. After an exothermic peak was observed, heating and stirring were further performed at 95° C. for 1 hour. After the polymerization was terminated, a suspension of a resin composition (e-9) was obtained. The polymerization conversion was 99.5% by mass. The morphology of the resin composition (e-9) was such that methacrylic resin (PMMA) particles were dispersed in the matrix.

After washing and drying, the obtained resin composition (e-9) was hot-pressed to produce 3-mm and 1-mm thick molded articles (test pieces). Table 3 shows the evaluation results of the molded articles.

Comparative Example 9

Using pellets of an impact resistant methacrylic resin containing multi-layered acrylic rubber particles (Parapet GR-100, manufactured by Kuraray Co., Ltd.), a 3-mm thick molded article (test piece) was prepared by hot-pressing. Table 3 shows the evaluation results of the molded article.

The results shown in Tables 2 and 3 indicate that the molded articles using the resin compositions (EXAMPLES 4-7) obtained by dispersing the star block copolymer (B) comprising a polymer block (a) composed of a (meth) acrylic acid alkyl ester unit and a polymer block (b) composed of a conjugated diene compound unit, in the matrix (A) composed of a methacrylic resin comprising not less than 50% by mass of a methyl methacrylate unit, exhibited improved impact resistance and rigidity, compared with the molded articles using the compositions (COMPARATIVE EXAMPLES 4-6) obtained by dispersing a diblock copolymer in a methacrylic resin, the composition (COMPARATIVE EXAMPLE 7) obtained by dispersing a styrene-butadiene block copolymer in a methacrylic resin, the resin composition (COMPARATIVE EXAMPLE 8) obtained by dispersing a methacrylic resin in a block copolymer, and the composition (COMPARATIVE EXAMPLE 9) obtained by dispersing commercially available multi-layered acrylic rubber particles in a methacrylic resin. It is also revealed that the molded articles (EXAMPLES) comprising the resin compositions using the resin modifiers (star block copolymers (B-1)-(B-3)) of the present invention have less haze (i.e., excellent transparency).

INDUSTRIAL APPLICABILITY

The present invention provides a methacrylic resin composition, of which impact resistance is improved without sacrificing excellent weather resistance, transparency, scratch resistance, and rigidity of the methacrylic resin; and a molded article obtained from the methacrylic resin composition. Such molded articles are applicable to signboard parts, display parts, illumination parts, interior parts, structural parts, transport machine parts, electronic equipment parts, medical equipment parts, equipment-related parts, optical-related parts, traffic-related parts, film components, home electronics components, etc.

The invention claimed is:

1. A methacrylic resin composition comprising:
   100 parts by mass of a matrix (A) composed of a methacrylic resin which comprises not less than 50% by mass of a methyl methacrylate unit, and
   1 to 80 parts by mass of a star block copolymer (B) which comprises a polymer block (a) composed of a (meth) acrylic acid alkyl ester unit and a polymer block (b) composed of a conjugated diene compound unit, and is dispersed in the matrix (A),
   wherein the polymer block (a) has a glass transition temperature of 0° C. or lower and the polymer block (b) has a glass transition temperature of 0° C. or lower.

2. The methacrylic resin composition according to the claim 1, wherein the star block copolymer (B) comprises an arm polymer block, and has a number average molecular weight, in terms of polystyrene measured by gel permeation chromatography (GPC), satisfying the inequality:
   [the number average molecular weight of the star block copolymer] >2 ×[the number average molecular weight of the arm polymer block].

3. The methacrylic resin composition according to the claim 1, wherein the star block copolymer (B) is represented by the chemical structural formula:

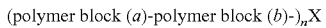

(polymer block (a)-polymer block (b)-)$_n$X wherein X is a coupling agent residue, and n is number greater than 2.

4. The methacrylic resin composition according to the claim 1, wherein the (meth)acrylic acid alkyl ester unit is an acrylic acid alkyl ester unit.

5. The methacrylic resin composition according to the claim 1, wherein the (meth)acrylic acid alkyl ester unit is an n-butyl acrylate unit.

6. The methacrylic resin composition according to the claim 1, wherein the conjugated diene compound unit is 1,3-butadiene unit.

7. The methacrylic resin composition according to the claim 1, wherein the star block copolymer (B) comprises 45 to 75% by mass of the polymer block and 25 to 55% by mass of the polymer block (b), wherein the star block copolymer (B) has a refractive index of 1.48 to 1.50.

8. A molded article comprising the methacrylic resin composition according to the claim 1.

9. The methacrylic resin composition according to the claim 1, wherein the refractive index of the star block copolymer (B) is 1.48 to 1.50.

* * * * *